United States Patent [19]

Nishimori

[11] Patent Number: 6,099,981
[45] Date of Patent: Aug. 8, 2000

[54] MAGNETIC RECORDING MEDIUM HAVING A LUBRICANT FILM COATED ON OPTIMUM CONDITIONS AND METHOD OF EVALUATING THE LUBRICANT FILM

[75] Inventor: Ken-Ichi Nishimori, Tokyo, Japan

[73] Assignee: Hoya Corporation, Tokyo, Japan

[21] Appl. No.: 09/283,305

[22] Filed: Apr. 1, 1999

Related U.S. Application Data

[62] Division of application No. 08/493,268, Jun. 21, 1995, Pat. No. 5,919,560.

[30]  Foreign Application Priority Data

Dec. 28, 1993  [JP]  Japan .................................. 5-336425

[51] Int. Cl.[7] ...................................................... G11B 5/71
[52] U.S. Cl. ................................ 428/694 R; 428/694 TF; 428/900; 250/307
[58] Field of Search ...................... 250/307; 428/694 TF, 428/141, 900, 694 TP, 421, 333, 694 BP, 694 R

[56]  References Cited

U.S. PATENT DOCUMENTS

| | | | |
|---|---|---|---|
| 5,061,562 | 10/1991 | Yamanaka et al. | 428/408 |
| 5,069,967 | 12/1991 | Yokoyama et al. | 428/336 |
| 5,082,709 | 1/1992 | Suzuki et al. | 428/65.4 |
| 5,144,134 | 9/1992 | Onodera et al. | 250/307 |
| 5,162,163 | 11/1992 | Ohta et al. | 428/694 BP |
| 5,178,954 | 1/1993 | Norman et al. | 428/422 |
| 5,344,706 | 9/1994 | Lambeth et al. | 428/336 |

FOREIGN PATENT DOCUMENTS

| | | |
|---|---|---|
| 4 109 427 | 4/1992 | Japan . |
| 4 168 622 | 6/1992 | Japan . |
| 8 805 591 | 7/1988 | WIPO . |

OTHER PUBLICATIONS

Journal of Applied Physics, vol. 69, No. 12, pp. 8042–8046, XP 000237525, Characterization of Lubrication States on Carbon Coated Media by Low Energy Photoelectron Spectroscopy Method in Ambient Atmosphere.

T. Miyamoto, et al "Friction and Wear Characteristics of Thin Film Disk Media in Boundary Lubrication"; Tribology and Mechanics of Magnetic Storage Systems; vol. V; pp. 55–61.

K. Merchant, et al; "Lubricant Bonding and Orientation on Carbon Coated Media"; IEEE Transactions on Magnetics, vol. 26; No. 5; Sep. 1990; pp. 2688–2690.

*Primary Examiner*—Stevan A. Resan
*Attorney, Agent, or Firm*—Sughrue, Mion, Zinn, Macpeak & Seas, PLLC

[57]  ABSTRACT

In a magnetic recording medium including a nonmagnetic substrate on which a magnetic layer, a protection film, and a lubricant film are successively stacked, the lubricant film is formed by quantitatively controlling an amount of a lubricant in consideration of a surface coverage ratio of the lubricant film relative to the protection film and an average thickness of the lubricant film. Preferably, the surface coverage ratio is selected between 0.55 and 0.985 while the average thickness is not smaller than 0.4 time an attenuation length of a photoelectron which is emitted from a predetermined element and which is attenuated in the lubricant film. To this end, an x-ray photoelectron spectroscopy is used to evaluate the lubricant film.

7 Claims, 5 Drawing Sheets

MAGNETIC RECORDING MEDIUM HAVING A LUBRICANT FILM COATED ON OPTIMUM CONDITIONS AND METHOD OF EVALUATING THE LUBRICANT FILM

This is a divisional of application No. 08/493,268 filed Jun. 21, 1995 now U.S. Pat. No. 5,919,560, the disclosure of which is incorporated herein by reference.

BACKGROUND OF THE INVENTION

This invention relates to a magnetic recording medium, such as a hard disk, a flexible disk, a magnetic tape, for use in a magnetic recording device and a method of manufacturing and evaluating the same.

In general, a magnetic recording device of the type described includes a magnetic recording medium, such as a hard disk, and a head slider movable along a surface of the magnetic recording medium. In such a magnetic recording device, a contact start stop (CSS) method is adopted such that the head slider is initially brought into contact with the surface of the magnetic recording medium and is thereafter caused to gradually float off the surface of the magnetic recording medium with a floating gap left between the surface of the magnetic recording medium and the head slider when the magnetic recording device is driven. Thereafter, the head slider is contacted with the surface of the magnetic recording medium and stopped in the CSS method.

A high recording density is recently required for the magnetic recording device so as to store a great deal of information in the magnetic recording device. Herein, it is to be noted that such a high recording density tends to narrow the floating gap between the head slider and the magnetic recording medium more and more. As long as the CSS method is adopted in the magnetic recording device, the head slider is slid along the magnetic recording medium and should be inevitably brought into contact with the magnetic recording medium intermittently or periodically.

With this structure, contacting the magnetic recording medium with the head slider gives rise to various kinds of tribological problems which bring about serious degradation of reliability of the magnetic recording device. Especially, a head crash phenomenon becomes very serious which stems from friction on an interface between the head slider and the magnetic recording medium during a sliding and contacting state. Such an interface may be called a head disk interface (will be abbreviated to HDI hereinunder). This is because such friction results in a mechanical and frictional damage on the magnetic recording medium and a final destruction of a magnetic layer included in the magnetic recording medium.

In order to solve the tribological problems, a wide variety of proposals have been offered as will be described hereinunder.

For example, a magnetic recording device which is disclosed in Japanese Unexamined Patent Publication No. 4-109427, namely, 109427/1992 includes a protection film of metal oxide, nitride, or the like as an outermost layer. Specifically, the magnetic recording medium comprises a nonmagnetic substrate formed by a combination of a non-magnetic base and an underlying layer, an intermediate layer on the nonmagnetic substrate, and a magnetic layer on the intermediate layer. The protection film is overcoated or overlaid on the magnetic layer to prevent the head slider from being directly contacted with the magnetic layer. With this structure, it is also possible to improve friction resistance and abrasion resistance.

Alternatively, a lubricant layer is formed by a lubricant coated on the protection film so as to furthermore improve the abrasion resistance. In addition, the lubricant layer is also effective to improve lubricity of the magnetic recording medium.

According to the inventor's experimental studies, it has been found out that the lubricant is very often composed of a compound of a fluorocarbon system, a hydrocarbon system, or the like and includes a polymer which is formed by a union of simple molecules concatenated in chain and which has polar groups at two ends of the chain. Furthermore, it has been found out that, when such a lubricant is coated on the protection layer, the tribological property at the HDI is mainly determined by a coating amount of the lubricant.

More specifically, when the coating amount of the lubricant is insufficient, the protection layer is directed brought into contact with the head slider which is being slid along the magnetic recording medium. As a result, a damage is liable to occur on the magnetic recording medium or the head slider.

On the other hand, when an excessive amount of the lubricant is coated on the protection layer, the head slider is apt to be stuck to the magnetic recording medium and, as a result, stiction often takes place between the head slider and the magnetic recording medium and makes rotation of the magnetic recording device difficult. This deteriorates a function of the lubricant layer.

From this fact, it is inferred that a remnant amount of a lubricant serves to determine both a distribution state of the lubricant on the protection layer and lublicity of the lubricant layer at the HDI. Therefore, it is preferable that the remnant amount of the lubricant is accurately measured with the lubricant layer coated on the protection layer.

Practically, the remnant amount of the lubricant might be measured either by an ellipsometric method or by the use of a Fourier transform-infrared spectrophotometer (FT-IR), as suggested in the articles disclosed in "Tribology and Mechanics of Magnetic Storage Systems" (Vol.5, SP-25, STLE, 1988, pages 55–61) and IEEE Trans. Magn., Vol. 26, No.5 Sept., 1990, pages 2688–2690.

With the above-mentioned methods, no consideration is made at all in connection with the case where a lubricant film is dispersed on the protection film in the form of lubricant film islands with the protection film partially uncovered. Specifically, an average thickness can not be precisely determined by the above-mentioned methods because it is difficult to accurately calculate the average thickness of the lubricant film islands which are dispersed with uncovered portions partially left on the protection film.

Accordingly, the above-mentioned methods can not accurately evaluate the lubricant film which is dispersed in the form of the lubricant film islands. As a result, a uniform lubricant layer can not be coated on the protection film with these methods. This shows that an invariable characteristic can not be insured.

In Japanese Unexamined Patent Publication No. Hei 4-168622, a proposal has been made regarding about a method of pre-processing the protection film by a laser beam and plasma before the lubricant layer is coated. With this method, the protection film is divided by the pre-processing into two regions which has good and bad wettability for the lubricant. The lubricant is deposited only on the region having the good wettability and serves to selectively form the lubricant films on the protection film.

However, no teaching is made in the above patent publication about a method of evaluating the lubricant film or about an optimum lubricant film. Thus, it is impossible to know conditions of the optimum lubricant film from the patent publication.

SUMMARY OF THE INVENTION

It is an object of this invention to provide a magnetic recording medium which is capable of improving tribology on a head and disk interface (HDI).

It is another object of this invention to provide a magnetic recording medium of the type described, which can exhibit excellent lubricity.

It is still another object of this invention to provide a method of evaluating lubricity of a lubricant layer deposited on a protection layer.

A magnetic recording medium to which this invention is applicable comprises a nonmagnetic substrate, a magnetic layer, a protection layer, and a lubricant layer, all of which are successively deposited. According to an aspect of this invention, the lubricant layer is dispersed on the protection layer so that a coverage ratio β of covering the protection layer with the lubricant layer falls within a range between 0.55 and 0.985 and an average thickness $t_c$ of the lubricant layer is specified by an attenuation length of a photoelectron emitted from a specific element included in the lubricant layer and is not smaller than 0.4.

According to another aspect of this invention, a method comprises the steps of successively depositing the magnetic layer and the protection layer on the nonmagnetic substrate, cleaning the surface of the protection layer to be heated, and coating a lubricant material on the protection layer to leave a lubricant layer which is studded on the protection layer in the form of islands.

According to another aspect of this invention, a method is for use in evaluating a magnetic recording medium which comprises a protection layer and a lubricant layer on the protection layer. The lubricant layer includes a specific element. The method comprises the steps of measuring a coverage ratio β of covering the protection layer with the lubricant layer, measuring an average thickness $t^c$ of the lubricant layer, and evaluating the lubricant layer by the use of the coverage ratio β and the average thickness $t^c$.

DESCRIPTION OF THE PREFERRED EMBODIMENTS

Figure 1:
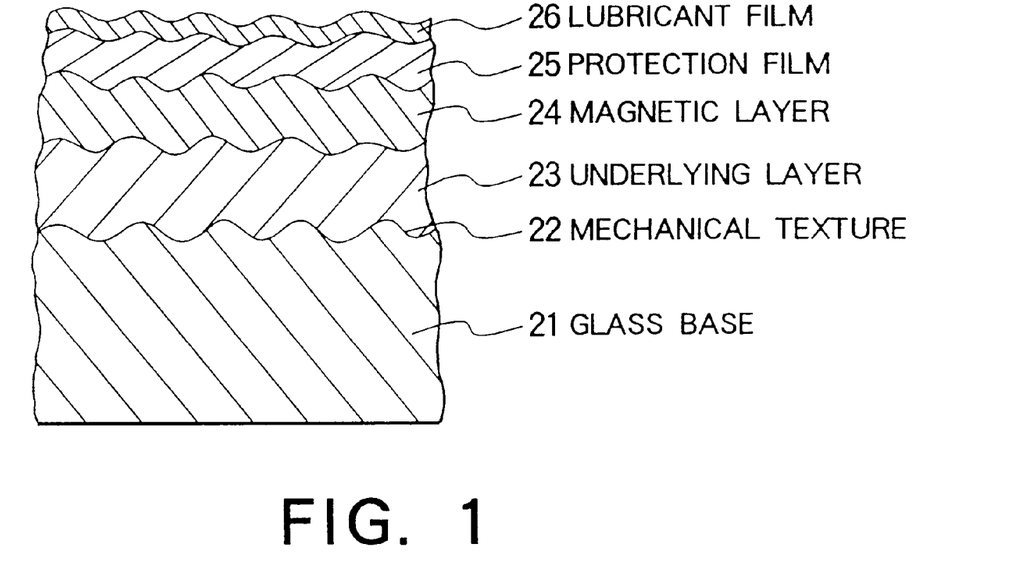
FIG. 1 is a sectional view of a magnetic recording medium to which this invention is applicable.

Referring to FIG. 1, a magnetic recording medium according to an embodiment of this invention is formed by a nonmagnetic base 21 of glass which has a principal surface directed upwards of FIG. 1 and subjected to mirror finish. As a result, the principal surface has a roughness less than 2 nm when measured by a maximum height. Thereafter, the nonmagnetic base 21 is introduced into a ultrasonic cleaner and cleaned for five minutes by ultrasonic waves in a bath of pure water and isopropyl alcohol (IPA) of 99.9% in purity to remove contaminants attached to the principal surface of the nonmagnetic base 21. Thereafter, the nonmagnetic base is left in a vapor of IPA for 1.5 minutes and is dried.

In FIG. 1, a mechanical texture 22 is concentrically formed on the principal surface of the nonmagnetic base 21 by the use of a lapping tape which may be, for example, of a diamond abrasive grain type (D#8000, an average abrasive grain of 1 micron meter). In other words, the mechanical texture 22 is formed by a lapping process which may be called a texturing process. Accordingly, the principal surface of the nonmagnetic base 21 becomes rugged or uneven by the mechanical texture 22. Specifically, the texturing process was practically carried out in the following manners. The nonmagnetic base 21 w as mounted onto a texturing apparatus and rotated at a revolution speed of 200 rpm while the lapping tape was fed at a rate of 50 cm/min with a tape pressure kept at 1.0 kgf/cm$^2$.

With this texturing process, it was possible to realize a surface roughness of 5 nm in RMS (root mean square value).

As shown in FIG. 1, an underlying layer 23 is deposited onto the nonmagnetic base 21 which has the mechanical texture thereon. The underlying layer 23 is deposited to a thickness of 100 nm and is composed of chrome. Thus, a combination of the nonmagnetic base 21 and the underlying layer 23 serves as a nonmagnetic substrate and may be therefore collectively referred to as the nonmagnetic substrate.

Further more, a magnetic layer 24 of CoNiCr is deposited or stacked onto the underlying layer 23 to a thickness of 50 nm. The magnetic layer 24 is covered with a protection film 25 of zirconia which is deposited by sputtering to a thickness of 20 nm and which serves to protect the magnetic layer 24 from head crash or the like.

Practically, both the underlying layer 23 and the magnetic layer 24 were deposited under the same sputtering conditions. More specifically, an argon gas (Ar) of 99.9% in purity was used as an atmospheric gas and was kept at a pressure of 5 mTorr with the gas flow rate of Ar kept at 10 SCCM. In addition, input electric power and a back pressure were kept at 100 W and 10$^{-7}$ Torr, respectively. At any rate, the above-mentioned sputtering was carried out without heating the nonmagnetic substrate.

Likewise, the protection film 25 was also deposited onto the magnetic layer 24 by sputtering by the use of a sputter target of, $ZrO_2$—$Y_2O_3$ (3 mol %) within an atmospheric gas which is composed of a mixed gas of an oxygen and an argon gas of 99.9% in purity. The argon gas was kept at a pressure of 5 mTorr and caused to flow at a gas flow rate of 10 SCCM with the oxygen caused to flow at another gas flow rate of 5 SCCM. In addition, the sputtering of the protection film 25 was carried out with the input electric power of 100 W impressed and with the back pressure kept at 10$^{-7}$ Torr and without heating the nonmagnetic substrate.

Thus, a disk sample was obtained by depositing the protection film 25. After deposition of the protection film 25, the disk sample was introduced into a cleaner to be subjected to a cleaning process. During the cleaning process, the disk sample was cleaned or washed for ten minutes by ultrasonic waves in a bath of isopropyl alcohol (IPA) of 99.9% in purity and was thereafter dried. As a result, contaminants attached to the disk sample can be eliminated during the cleaning process.

After the cleaning process, the disk sample was taken out of the cleaner and entered into a clean air oven to be heated for thirty minutes.

A lubricant is coated on the protection film 25 by a dipping method under a temperature of 22° C. and RH (relative humidity) of 42% to form a lubricant film 26. In order to form the lubricant film 26, selection is made about the lubricant which includes a material or polymer concatenated in chain between two ends each of which is composed of polar groups, such as a piperonyl group or the like. For example, the lubricant may be PFPE (perfluoropolyether) which is manufactured by Fomblin and sold in the name of AM2001 and which has a mean molecular weight of 2200. The lubricant selected may be diluted with a solvent to a predetermined lubricant concentration to form a diluted lubricant solution.

Specifically, when the PFPE was used as the lubricant, the solvent may be preferably HCFC which is manufactured by Asahi Glass Company Ltd., and sold in the name of AK-225. In this event, the PFPE has been diluted with the HCFC to the lubricant concentration of 0.01 vol % to form a diluted lubricant solution. The lubricant concentration is specified by a concentration which exhibits when the lubricant is mixed within the solvent.

Thereafter, the diluted lubricant solution was kept at a temperature of 22° C., agitated or stirred for three minutes by the use of an agitating rod of Teflon, and left for three minutes. Thus, an available lubricant solution was prepared through the above-mentioned processes.

After provision of the available lubricant solution, the disk sample was immersed or soaked into the available lubricant solution for one minute and thereafter slowly lifted up at a lifting rate of 1.4 mm/second. The lubricant was left on the protection film 25 of the resultant disk sample in the form of the lubricant film 26. Thus, the disk sample which has the lubricant film 26 coated on the protection film 25 was attained and heated at a temperature of 60° C. for ten minutes. As a result, a magnetic recording medium was manufactured in the manner mentioned above and will be referred to as a first sample.

Next, second through forty-fifth samples of magnetic recording media were prepared in a similar manner except that the mean molecular weights of the lubricants and/or the diluted lubricant concentrations were changed from the first sample. Specifically, the diluted lubricant concentrations (vol %) were changed from 0.01 vol % to 0.30 vol % in the first through the fifteenth samples (will be called a first group), the sixteenth through the thirtieth samples (will be called a second group), and the thirty-first through the forty-fifth samples (will be called a third group).

As shown in Table 1, the second through the fifteenth samples 2 to 15 of the first group were formed by the lubricant, namely, PFPE, which was used in the first sample and which had the mean molecular weight of 2200 and the piperonyl group at both ends.

TABLE 1

| Diluted Lubricant Concentrations (vol %) | Mean Molecular Weight of Lubricants | | |
|---|---|---|---|
| | 2200 | 2000 | 3200 |
| 0.01 | Sample 1 | Sample 16 | Sample 31 |
| 0.02 | Sample 2 | Sample 17 | Sample 32 |
| 0.03 | Sample 3 | Sample 18 | Sample 33 |
| 0.04 | Sample 4 | Sample 19 | Sample 34 |
| 0.05 | Sample 5 | Sample 20 | Sample 35 |
| 0.06 | Sample 6 | Sample 21 | Sample 36 |
| 0.07 | Sample 7 | Sample 22 | Sample 37 |
| 0.08 | Sample 8 | Sample 23 | Sample 38 |
| 0.09 | Sample 9 | Sample 24 | Sample 39 |
| 0.010 | Sample 10 | Sample 25 | Sample 40 |
| 0.0125 | Sample 11 | Sample 26 | Sample 41 |
| 0.15 | Sample 12 | Sample 27 | Sample 42 |
| 0.20 | Sample 13 | Sample 28 | Sample 43 |
| 0.25 | Sample 14 | Sample 29 | Sample 44 |
| 0.30 | Sample 15 | Sample 30 | Sample 45 |

On the other hand, the sixteenth through the thirtieth samples 16 to 30 of the second group had lubricant layers formed by PFPE (manufactured by Fomblin and sold in the name of ZDEAL) which has a carboxyl ester group as the polar group at both ends and and the mean molecular weight of 2000 while the thirty-first through the forty-fifth samples 31 to 45 of the third group had lubricant layers formed by PFPE (manufactured by Fomblin and sold in the name of AM3001) which has the polar groups at both ends and the mean molecular weight of 3200.

Herein, the first through the forty-fifth samples were evaluated by an X-ray photoelectron spectroscopy (abbreviated to an XPS) according to the present invention which will be later described in detail. Herein, it is to be noted that the X-ray photoelectron spectroscopy is used in each of the samples 1 through 45 to measure an average thickness of the lubricant film 26 which is coated on the protection film 25.

Figure 2:
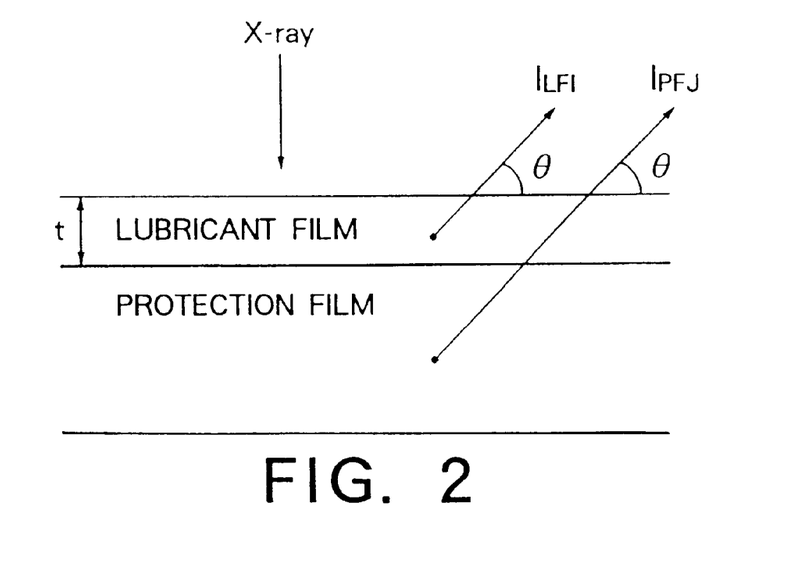
FIG. 2 shows a view for use in describing a principle of a method according to this invention.

At first, let the XPS be used in FIG. 2 to measure the average thickness of the lubricant film 26 on the assumption that the lubricant film 26 and the protection film 25 are uniformly formed on the whole of the magnetic recording media.

In this case, when a photoelectron intensity (will be called a first intensity hereinunder) of a photoelectron emitted from a certain element i included in the lubricant film 26 is represented by $I_{LFi}$ and another photoelectron intensity (will be called a second intensity) of a photoelectron emitted from an element j included in the protection film 25 is represented by $I_{PFj}$, the average thickness of the lubricant film 26 is given by:

$$t = \lambda_{LFi} \sin\theta \ln[1 + (A \, I_{LFi}/I_{PFj})], \quad (1)$$

where $$A = S_j \, n_j \, \sigma_j \, \lambda_{PFj} / S_i \, n_i \sigma_i \, \lambda_{LFi} \text{ and} \quad (2)$$

in turn, $S_i$ is representative of an efficiency of a spectroscope for detecting the element i included in the lubricant film 26;

$S_j$, an efficiency of the spectroscope for detecting the element j included in the protection film 25;

$n_i$, an atomic density of the element i included in the lubricant film 26;

$n_j$, an atomic density of the element j included in the protection film 25;

$\sigma_i$, a sectional area ionized in the lubricant film 26;

$\sigma_j$, a sectional area ionized in the protection film 25;

$\lambda_{LFi}$, an attenuation length of a photoelectron which is emitted from the element i and which is attenuated in the lubricant film 26;

$\lambda_{PFj}$, an attenuation length of a photoelectron which is emitted from the element j and which is attenuated in the protection film 25; and $\theta$, a detection angle of each photoelectron which is given by an angle between the photoelectron detector and a surface of an object to be measured.

In addition, Equation (1) is readily rewritten into:

$$\ln[1+(A\ I_{LFi}/I_{PFj})]=t/(\lambda_{LFi} \sin \theta). \tag{3}$$

It is readily understood that Equation (3) represents a relationship between an intensity ratio and the detection angle $\theta$. The intensity ratio is specified by a ratio of intensities in the lubricant film 26 and the protection film 25.

Figure 3:
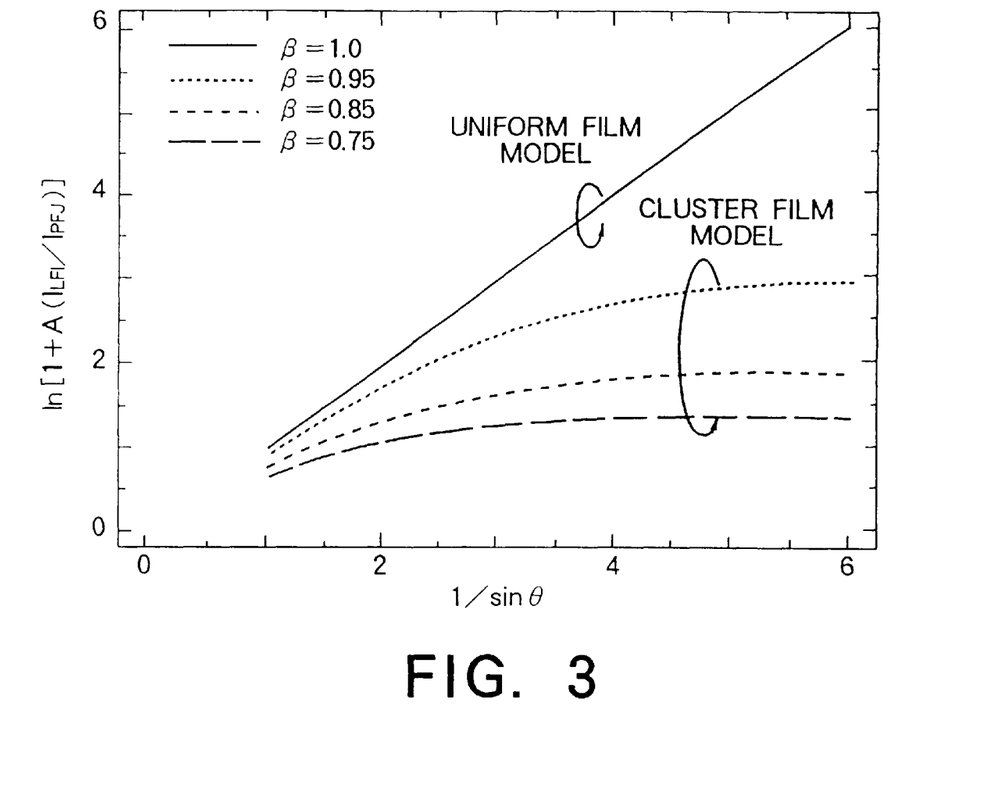
FIG. 3 is a graphical representation for describing relationships used in the method illustrated with reference to FIG. 2.

Taking Equation (3) into consideration, a first term, namely, $(1/\sin \theta)$ and a second term, namely, $\ln[130\ (A\ I_{LFi}/I_{PFj})]$ are taken along an abscissa and an ordinate of FIG. 3, respectively.

From Equation (3), it is apparent that the first term $(1/\sin \theta)$ is in direct proportion to the second term $\ln[1+(A\ I_{LFi}/I_{PFj})]$, as shown by a real line in FIG. 3, when the lubricant film 26 is uniformly and completely coated on the protection film 25.

Herein, it is to be noted that Equation (1) includes a product of a reciprocal number of the first term and the second term and that the product becomes invariable. In other words, the average thickness t which is calculated from Equation (1) becomes constant without depending on $\theta$.

Figure 4:
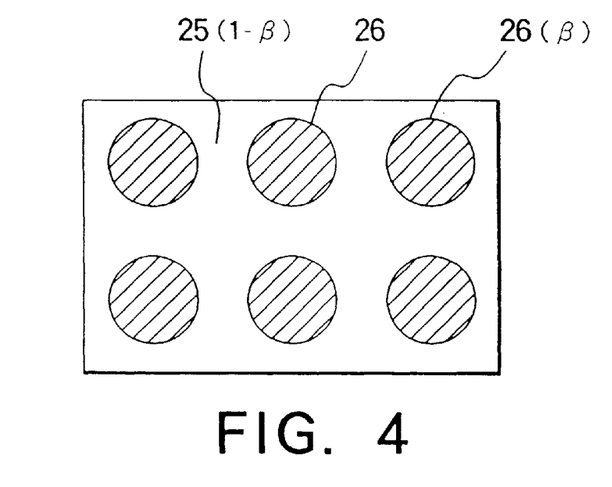
FIG. 4 shows a diagrammatical plan view for describing a protection film and a lubricant film.

Referring to FIG. 4, it is assumed that the lubricant films 26 are dispersed on the protection film 25 like circular islands isolated from one another. Such a group of islands may be referred to as a cluster of lubricant film islands hereinunder.

Under the circumstances, it is possible to consider a cluster model in connection with the cluster of the lubricant film islands like in the uniform film model. Therefore, let consideration be made about a relationship between the first term $(1/\sin \theta)$ and the second term $(\ln[1+(A\ I_{LFi}/I_{PFj})])$ hereinunder.

In this event, it has been found out that the relationship between the first and the second terms depends on an area ratio of areas of the lubricant films 26 and an area of the protection film 25. The area ratio may be referred to as a surface coverage ratio hereinafter and may be represented by $\beta$. In FIG. 4, a total area of the cluster of the lubricant film islands 26 is given by $\beta$ while the remaining exposed area of the protection film 25 is given by $(1-\beta)$.

Now, let consideration be made about the photoelectron intensities $I_{Lfi}$ and $I_{PFj}$ of a photoelectron emitted from each element i and j included in the lubricant film 26 and the protection film 25. The photoelectron intensities $I_{LFi}$ and $I_{PFj}$ in the lubricant films 26 and the protection film 25 are given by:

$$I_{LFi}=\beta S_i\ I_0\ n_i\ \sigma_i\ \lambda_{LFi}\ \sin\ \theta x[1-\exp(-t_c/\lambda_{LFi}\ \sin\ \theta)] \text{ and} \tag{4}$$

$$I_{PFj}=(1-\beta)\ S_j\ I_0\ n_j\ \sigma_j\ \lambda_{PFj}\ \sin\ \theta+\beta\ S_j\ I_0\ n_j\ \sigma_j\ \lambda_{PFj}\ \sin\ \theta\ \exp(-t_c/\lambda_{LFj}\ \sin\ \theta), \tag{5}$$

where $I_0$ is representative of an intensity of an incident X-ray and $t_c$, an average thickness of the lubricant films 26 dispersed in the manner illustrated in FIG. 4.

When $\theta=90'$, $t_c$ is defined by:

$$t_c=t/\beta, =\lambda_{LFi} \ln[1+(A\ I_{LFi}/I_{pFj})]/\beta. \tag{6}$$

Herein, let consideration be made about the same element included in the lubricant films 26 and the protection film 25. Furthermore, a ratio between Equations (4) and (5) is given by:

$$A \cdot \frac{I_{LFi}}{I_{PFj}} = \frac{\beta[1 - \exp(-t_c/\lambda_{LFi}\sin\theta)]}{(1-\beta) + \beta\exp(-t_c/\lambda_{LFj}\sin\theta)} \tag{7}$$

If Equation (7) is substituted into the left hand side of Equation (3) and $\beta$ is varied between 0.75 and 0.95, the relationships between the first term $(1/\sin \theta)$ and the second term $(\ln[1+(A\ I_{LFi}/I_{PFi})])$ can be calculated and results of calculations are shown in FIG. 3 by broken line curves which specify a cluster film model. As are apparent from the broken line curves in FIG. 3, the first term is not directly proportional to the second term, which is different from the uniform film model.

Accordingly, a product of a reciprocal number of the first term and the second term is variable and the average thickness $t_c$ can not be therefore provided by the use of Equation (1) alone when the lubricant films 26 are dispersed on the protection film 25, as shown in FIG. 4. However, the inventor has known that the broken line curves shown in FIG. 3 are uniquely determined by the coverage ratio $\beta$.

More specifically, the first through the forty-fifth samples 1 to 45 were measured by the XPS method and were evaluated in accordance with the fact mentioned above. The XPS methods were carried out under the following conditions enumerated in Table 2.

TABLE 2

| Set-up items | Set-up conditions |
| --- | --- |
| Machine | PHI-5400 MC of Perkin Elmer make |
| Target Peak of Measurement | 01 s |
| Impressed Voltage | 15 kV |
| Current | 20 mA |
| X-ray Source | 300 W |
| X-ray Excitation Source | Mg-kα ray (1253.6 eV) |
| Degree of Vacuum in Analysis Chamber | $<2 \times 10^{-7}$ Pa |
| Path Energy | 8.95 eV |
| Detection angle ($\theta$) of Photoelectron | 12, 13, 14, 20, 30, 45, and 90° |
| Analysis Region | 1 mmφ (at $\theta$ = 45°) |
| Accumulation Times | 3 times |
| Scanning speed | 0.05 eV/Step |

Figure 5:
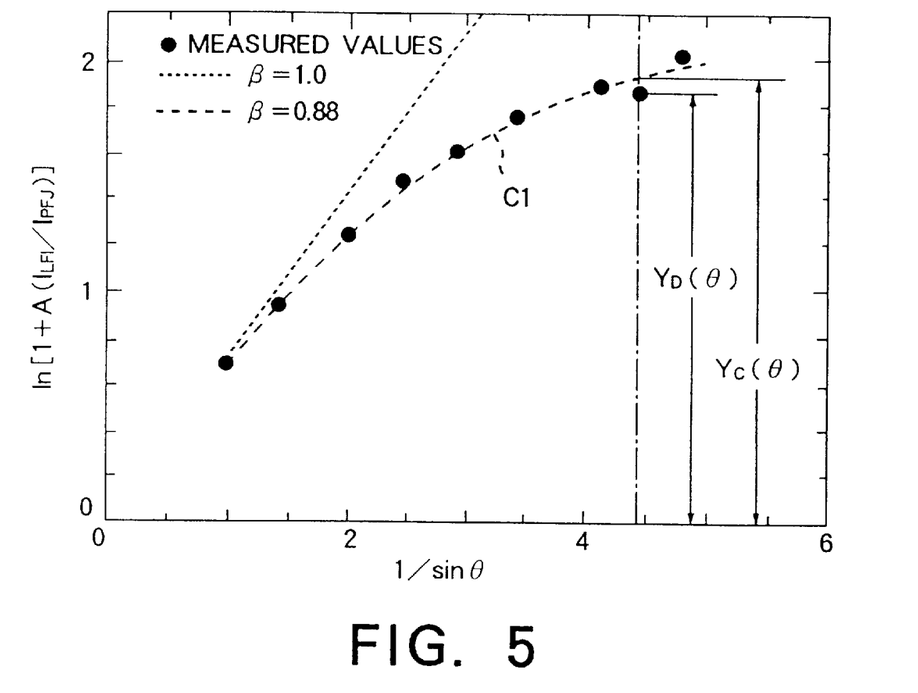
FIG. 5 is a graphical representation for describing the method of evaluating the lubricant film in detail.

Referring to FIG. 5, results of measurement were illustrated by a curve c1 which represents a relationship between the first term $(1/\sin \theta)$ and the second term $(\ln[1+(A\ I_{LFi}/I_{PFj})])$, where $I_{LFi}$ is representative of the emission intensity of a photoelectron 01s emitted from oxygen (O) included in the lubricant film 26 and $I_{PFj}$, the emission intensity of a photoelectron 01s emitted from oxygen (O) included in the protection film 25. The curve c1 which represents the results of measurement was well matched with the curves of FIG. 3 related to the cluster film model. Accordingly, the first term is not directly proportional to the second term, as mentioned in connection with FIG. 3. This tendency was observed not only in a part of the samples shown in Table 1 but also in all of the samples according to the present invention.

Under the circumstances, calculations were performed in connection with the cluster film models at each detection angle of the photoelectron by the use of the relationships between the first term $(1/\sin \theta)$ and the second term $(\ln[1+(A$ $I_{LFi}/I_{PFj}$)] to obtain results of calculations, namely, calculation results shown by ($Y_C(\theta)$)) In addition, measurements were also made to obtain the measurement results $Y_D(\theta)$ shown by dots in FIG. 5. Thereafter, square sums of differences were calculated between the calculation results ($Y_C(\theta)$) and the measurement results $Y_D(\theta)$. Subsequently, a single one of the cluster film model curves that corresponds to β is selected such that the square sums of the above-mentioned differences become minimum. The value of β is defined as a surface coverage ratio of the lubricant film islands 26.

On the other hand, the average thickness t can be uniquely determined, as readily understood from Equation (1). Specifically, the average thickness t is obtained by calculating a product of sin θ and the second term representative of an intensity ratio ($\ln[1+(A\,I_{LFi}/I_{PFj}])$) emitted from elements i and j included in the lubricant film 26 and the protection film 25 and by multiplying the product by the attenuation length ($\lambda_{LFi}$) of the photoelectron emitted from the element i.

Such an attenuation length $\lambda_{LFi}$ can be often calculated by the use of an empirical formula which defines, in an organic compound, an attenuation length of a photoelectron emitted from an element included in the organic compound. The attenuation length $\lambda_{LFi}$ is irregularly varied in dependency upon variation of data used in the empirical formula and is uniquely determined by such data. However, such an attenuation length $\lambda_{LFi}$ is not desirable for determining an average thickness of the lubricant film islands 26 because of irregular variation of the attenuation length $\lambda_{LFi}$.

Taking this into account, the average thickness t or $t_c$ is calculated by the use of the attenuation length $\lambda_{LFi}$ calculated in the form of an average value, as shown in Equations (1) and (6).

The surface coverage ratio β and the average thickness $t_c$ are calculated in connection with the first through the forty-fifth samples 1 to 45 and are shown in Table 3.

head slider was positioned on each sample so that a center of an air bearing surface (ABS) placed on an inner peripheral side is located at a position which is remote from a center of each sample by 17.5 mm.

Figure 6:
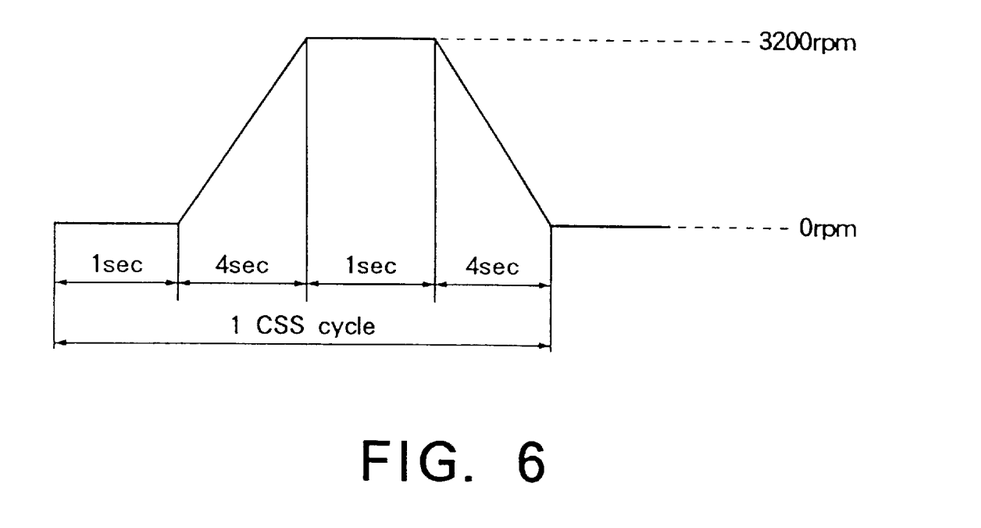
FIG. 6 shows a CSS cycle used in the method illustrated with reference to FIG. 5.

The CSS durability test was performed on the basis of a CSS pattern illustrated in FIG. 6. The CSS pattern was specified by a single CSS cycle of ten seconds divided into first, second, third, and fourth durations which last for 1, 4, 1, and 4 seconds, respectively. As readily understood from FIG. 6, the rotation speed of each sample was equal to zero within the first duration, speeded up to a rotation speed of 3200 rpm within the second duration, kept at 3200 rpm within the third duration, and thereafter decreased to zero within the fourth duration. The head used in the CSS durability test was an inline type head manufactured and sold by IBM while the head slider was composed of a material of $Al_2O_3$- TiC. In addition, the head load was 6.5 gf.

The CSS durability test was made on the conditions of a cleanliness factor of 100, the temperature of 22° C., and the relative humidity (RH) of 42%.

Figure 7:
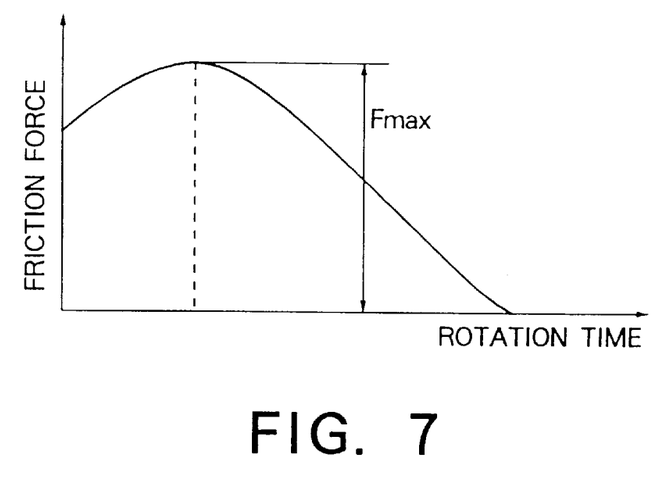
FIG. 7 shows a slider floating curve for use in describing a relationship between a rotation time of a disk and friction force.

On the CSS durability test, a slider floating curve as illustrated in FIG. 7 was predetermined and measured at every one of the CSS cycles to monitor a maximum friction on the slider floating curve. Thereafter, the maximum friction is divided by the head load to calculate a coefficient of dynamic friction. The coefficient of dynamic friction which exceeds 1.0 was defined as a CSS durable factor or frequency. In Table 3, when the CSS durable frequency exceeds 30,000, (>30,000) is described as the durable frequency.

It is usual that each sample may be judged as a good one when the CSS durable frequency exceeds 10,000. In Table 3, the CSS durable frequency greater than 10,000 is established if β is not smaller than 0.55 and is not greater than 0.985 and if $t_c$ is not smaller than 0.4λ LFi.

Thus, it is possible to accurately evaluate the lubricant films 26 by measuring each sample by the use of both the

TABLE 3

| Diluted Lubricant Concentrations | Samples 1–15 | | | Samples 16–30 | | | Samples 31–45 | | |
| --- | --- | --- | --- | --- | --- | --- | --- | --- | --- |
| (vol %) | β | $t_c$ | CSS | β | $t_c$ | CSS | β | $t_c$ | CSS |
| 0.01 | 0.25 | 0.28 | 5,000 | 0.18 | 0.22 | 2,000 | 0.16 | 0.71 | 5,000 |
| 0.02 | 0.30 | 0.28 | 9,000 | 0.36 | 0.24 | 4,000 | 0.28 | 0.63 | 9,500 |
| 0.03 | 0.40 | 0.37 | 9,500 | 0.49 | 0.26 | 5,000 | 0.40 | 0.57 | 9,800 |
| 0.04 | 0.60 | 0.41 | >30,000 | 0.60 | 0.30 | 5,600 | 0.48 | 0.55 | 9,800 |
| 0.05 | 0.85 | 0.42 | >30,000 | 0.74 | 0.27 | 6,500 | 0.60 | 0.65 | >30,000 |
| 0.06 | 0.89 | 0.43 | >30,000 | 0.89 | 0.27 | 7,800 | 0.72 | 0.59 | >30,000 |
| 0.07 | 0.87 | 0.46 | >30,000 | 0.98 | 0.30 | 9,500 | 0.81 | 0.61 | >30,000 |
| 0.08 | 0.98 | 0.43 | >30,000 | 0.96 | 0.37 | 9,800 | 0.98 | 0.61 | >30,000 |
| 0.09 | 0.95 | 0.62 | >30,000 | 0.95 | 0.49 | >30,000 | 0.97 | 0.73 | >30,000 |
| 0.10 | 0.97 | 0.67 | >30,000 | 0.96 | 0.56 | >30,000 | 0.95 | 0.84 | >30,000 |
| 0.125 | 0.95 | 0.80 | >30,000 | 0.98 | 0.63 | >30,000 | 0.98 | 0.91 | 21,500 |
| 0.15 | 0.98 | 0.84 | >30,000 | 0.93 | 0.73 | >30,000 | 0.95 | 1.03 | 15,000 |
| 0.20 | 0.98 | 0.94 | 20,000 | 0.95 | 0.90 | 22,000 | 0.98 | 1.05 | 10,800 |
| 0.25 | 0.98 | 1.01 | 18,000 | 0.98 | 0.98 | 13,500 | 0.95 | 1.00 | 10,200 |
| 0.30 | 0.99 | 1.13 | 9,000 | 0.95 | 1.12 | 10,500 | 0.94 | 1.25 | 10,250 |

$t_c$ is represented by a multiple of $\lambda_{LFi}$

In Table 3, results of a CSS durability test are also tabulated together with the surface coverage ratios β and the average thicknesses $t_c$. The CSS durability test was conducted by the use of a disk friction and abrasion tester of a strain gauge type which is widely sold. In this event, each of the samples was mounted with screw torque of 1.5 kgfcm on a rotation spindle of the friction and abrasion tester and a surface coverage ratio β and the average thickness $t_c$ even when the lubricant films 26 are dispersed in the form of the lubricant film islands on the protection film 25, as shown in FIG. 4. In other words, an optimum cluster of the lubricant film islands 26 can be determined by monitoring the surface coverage ratio β and the average thickness $t_c$. At any rate, an optimum lubricity can be obtained by quantitatively defining parameters of the surface coverage ratio β and the average thickness $t^c$.

Such an excellent lubricity might be based on the fact that a direct contact between the head slider and the protection film 25 would be mitigated within the above-mentioned ranges during the sliding operation and that superfluous lubricant is not present on the magnetic recording medium. In other words, no excellent lubricity could be obtained outside of the above-mentioned range.

More specifically, when the surface coverage ratio β and the average thickness $t_c$ are lower than 0.55 and 0.42 $\lambda_{LFi}$, respectively, direct contacts frequently occur between the head slider and the protection film 25, which often brings about damages on the magnetic layer 24. On the other hand, it has been inferred that superfluous lubricant gives rise to stiction at the HDI when the surface coverage ratio exceeds 0.985.

Thus, the lubricity of the magnetic recording medium can be accurately evaluated by monitoring the average thickness $t_c$ and the surface coverage ratio λ LFi.

In the illustrated example, the protection film 25 is cleaned and thereafter heated prior to formation of the lubricant film 26 on the protection film 25. As a result, useless contaminants can be reduced from the protection film 25 and moisture can be evaporated from the protection film 25 to be reduced. This means that an even or flat lubricant film can be coated on the protection film 25 and results in an excellent lubricity of the magnetic recording medium.

Figure 8:
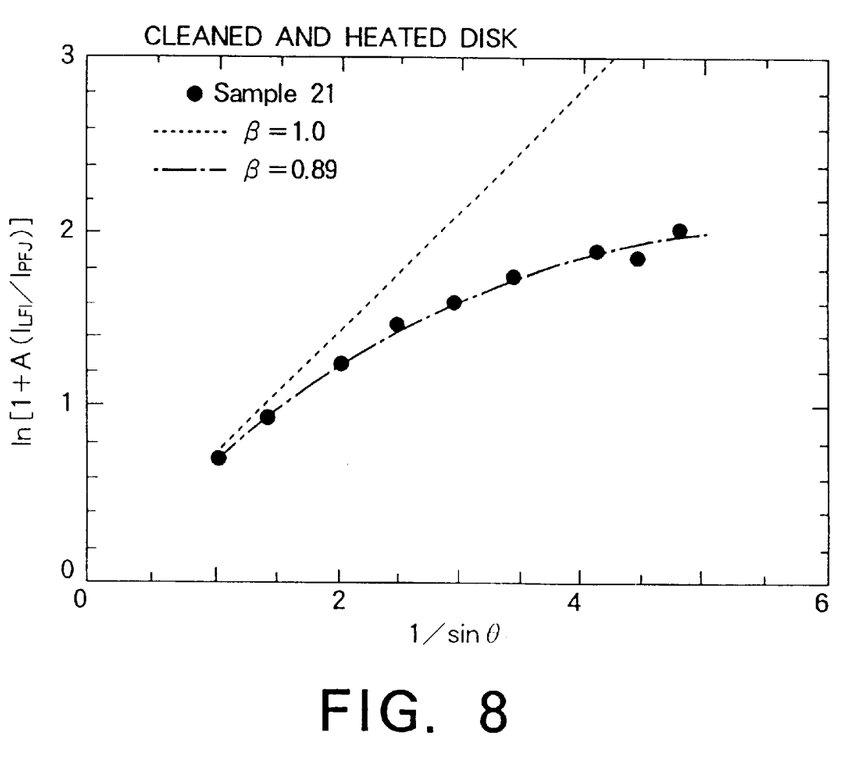
FIG. 8 is a graphical representation for use in describing a preferred method according to this invention.

Referring to FIG. 8, illustration is made about a relationship between the first term 1/sin and the second term which appears when the cleaning and the heating processes are carried out.

Figure 9:
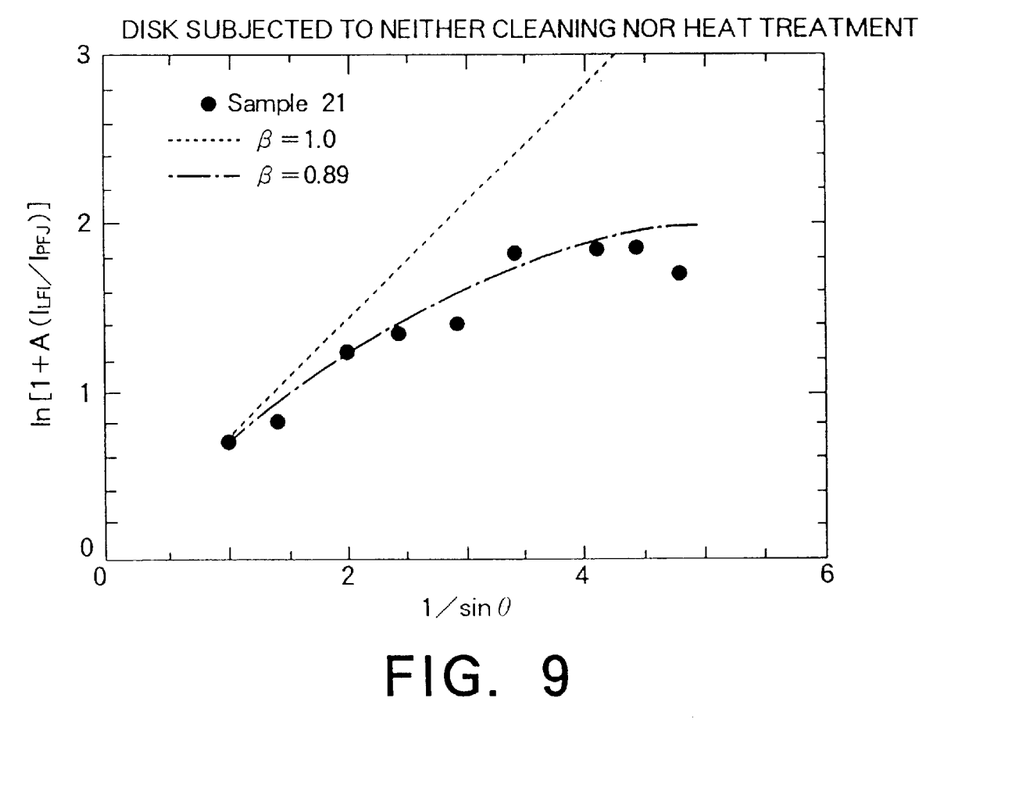
FIG. 9 is a similar representation for use in describing another method.

On the other hand, a similar relationship is illustrated in FIG. 9 and is obtained when the cleaning and the heating processes are not carried out.

Comparison between the relationships illustrated in FIGS. 8 and 9 teaches that a variation of the curve of the magnetic recording medium subjected to the cleaning and the heating processes is small in comparison with that of the curve of the magnetic recording medium which is not subjected to the cleaning and the heating processes. Specifically, as long as the evaluation method according to the present invention is concerned, it is preferable that the magnetic recording medium is subjected to the cleaning and the heating processes. In this event, the cleaning process may be desirably executed by a ultrasonic cleaning method or the like while the heating process may be executed at a temperature between 50 and 300° C.

While this invention has thus far been described in conjunction with a preferred embodiment thereof, it will readily be possible for those skilled in the art to put this invention into practice in various other manners. For example, the nonmagnetic base of the magnetic recording medium may be, for example, a glass base, an aluminum base, an aluminum alloy base, a carbon base, a plastic base, a ceramics base, or the like. On the other hand, the magnetic layer may be either a magnetic layer of, a cobalt system, such as CoNiCr, CoCrTa, CoPtCr, CoCrPtB, or the like or a magnetic layer of, for example, an iron system, such as FeC, FeN, or the like.

Furthermore, the protection film may be formed by oxides, such as $SiO_2$, $ZrO_2$, $TiO_2$, $CrO_2$, $Al_2O_3$, $Cr_2O_3$, $In_2O_3$, $SnO_2$; carbides, such as SiC, TiC; or nitrides, such as CBN, $C_3N_4$, $Si_3N_4$, TiN. The underlying layer may be formed, for example, by Cr, Ti, CrV, or the like.

Moreover, it has been confirmed that the lubricant which has polar groups arranged at the ends thereof is preferably adhered to the protection film. In this event, the polar groups arranged at both of the ends may not be restricted to a piperonyl group but a carboxyl group, a hydroxyl group, or the like. In addition, the lubricant may be coated on the protection film not only by the dipping coat method but also by a spin coating method.

As regards the lubricant films dispersed on the protection film as shown in FIG. 4, each of the lubricant films may not be always circular but may be an aggregation of molecules having a wide variety of geometrical configurations.

In addition, the present invention may be applicable not only to a hard disk but also to a floppy disk, a magnetic tape, or the like.

Although the lubricant film islands have so far been evaluated by the use of the X-ray photoelectron spectroscopy, any other evaluation methods may be used for evaluating the lubricant films, if the average thickness of the lubricant films and the surface coverage ratio can be determined by the methods. At any rate, it is possible to obtain the magnetic recording medium which has an excellent durability, by controlling the surface coverage ratio and the average thickness of a cluster of the lubricant films arranged on the protection film. Moreover, an amount of the lubricant can be quantitatively controlled on the protection film and, therefore, the lubricity can be precisely controlled with a high reliability.

What is claimed is:

1. A method of evaluating a magnetic recording medium which comprises a protection layer and a lubricant layer formed by lubricant polymer of PFPE on said protection layer, comprising the steps of:

measuring a coverage ratio β of covering the protection layer with the lubricant layer, by using x-ray photoelectron spectroscopy;

measuring an average thickness $t_c$ of the lubricant layer by using x-ray photoelectron spectroscopy, the average thickness $t_c$ being specified by an attenuation length $\lambda_{LFi}$ of a photoelectron emitted from a specific element i included in the lubricant layer; and judging lubricity of the lubricant layer to be excellent when the coverage ratio β and the average thickness $t_c$ fall within a predetermined range and at a value not smaller than 0.4 $\lambda_{LFi}$, respectively.

2. A method as claimed in claim 1, wherein said lubricant film is dispersed in the form of lubricant islands.

3. A method as claimed in claim 1, wherein said lubricant comprises a diluted lubricant.

4. A method as claimed in claim 1, further comprising a step of evaluating the lubricant layer using the results of a CSS durability test in order to determine which samples to consider for evaluating the magnetic recording medium.

5. A method as claimed in claim 4, wherein said selected samples have a measured CSS durability frequency that is greater than 10,000.

6. A method as claimed in claim 1, wherein said measured coverage ratio β includes values within a range between 0.55 and 0.985.

7. A method as claimed in claim 1, wherein said selected samples have a measured CSS durability frequency that is greater than 30,000.

* * * * *